United States Patent
Leow et al.

(10) Patent No.: US 12,457,151 B2
(45) Date of Patent: Oct. 28, 2025

(54) MULTIVARIATE AND MULTI-TIMESCALE ANOMALY DETECTION

(71) Applicant: Oracle International Corporation, Redwood Shores, CA (US)

(72) Inventors: Woei Ling Leow, Santa Clara, CA (US); Bill Byrd, San Francisco, CA (US); Rajagopal Iyengar, Cedar Park, TX (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/240,958

(22) Filed: Aug. 31, 2023

(65) Prior Publication Data

US 2025/0080405 A1    Mar. 6, 2025

(51) Int. Cl.
*H04L 41/0677* (2022.01)
*H04L 41/16* (2022.01)
*H04L 43/062* (2022.01)

(52) U.S. Cl.
CPC .......... *H04L 41/0677* (2013.01); *H04L 41/16* (2013.01); *H04L 43/062* (2013.01)

(58) Field of Classification Search
CPC .... H04L 41/0677; H04L 41/16; H04L 43/062
See application file for complete search history.

(56) References Cited

U.S. PATENT DOCUMENTS

| | | | |
|---|---|---|---|
| 8,724,904 B2 | 5/2014 | Fujiki et al. | |
| 9,679,243 B2 | 6/2017 | Zou et al. | |
| 10,410,113 B2 | 9/2019 | Clayton et al. | |
| 11,169,514 B2 | 11/2021 | Song et al. | |
| 2015/0269050 A1 | 9/2015 | Filimonov et al. | |
| 2017/0339178 A1* | 11/2017 | Mahaffey | H04L 41/142 |
| 2018/0027004 A1* | 1/2018 | Huang | H04L 43/04 726/23 |
| 2019/0050515 A1* | 2/2019 | Su | G06N 3/045 |
| 2019/0122138 A1* | 4/2019 | Li | G06N 5/04 |
| 2019/0147300 A1 | 5/2019 | Bathen et al. | |
| 2019/0379589 A1* | 12/2019 | Ryan | H04L 43/04 |
| 2020/0067969 A1* | 2/2020 | Abbaszadeh | G06N 5/04 |
| 2020/0387797 A1* | 12/2020 | Ryan | G06F 17/18 |
| 2021/0081477 A1* | 3/2021 | Tibbet | H04L 67/52 |

(Continued)

FOREIGN PATENT DOCUMENTS

EP    2851561 A1 *  3/2015  ............. F03D 17/00

OTHER PUBLICATIONS

Li G. et al., "Deep learning for anomaly detection in multivariate time series: Approaches, applications, and challenges", Information Fusion, vol. 91, Mar. 2023, pp. 93-102.

(Continued)

*Primary Examiner* — Patrice L Winder
(74) *Attorney, Agent, or Firm* — Invoke

(57) ABSTRACT

Techniques for anomaly detection are disclosed. An anomaly detection system transforms observation signals received from signal generators into multidimensional representations. The system extracts portions of the multidimensional representation indicative of anomalies. Based on the extracted portions of the multidimensional representation, the system determines metrics representing the observation signals and determines whether the metrics satisfy anomaly detection criteria.

19 Claims, 9 Drawing Sheets

(56) References Cited

U.S. PATENT DOCUMENTS

| | | |
|---|---|---|
| 2021/0089927 A9 | 3/2021 | Ryan et al. |
| 2021/0182385 A1* | 6/2021 | Roychowdhury ....... G06N 3/08 |
| 2021/0350213 A1* | 11/2021 | Sethi ....................... H04L 41/16 |
| 2022/0014554 A1* | 1/2022 | Vasu ...................... G06N 3/045 |
| 2023/0010764 A1* | 1/2023 | Gollnick ................ F03D 7/046 |

OTHER PUBLICATIONS

Rani V. et al., "Self-supervised Learning: A Succinct Review", Archives of Computational Methods in Engineering, 2023, vol. 30, pp. 2761-2775.
Yang C.L. et al., "Multivariate Time Series Data Transformation for Convolutional Neural Network", 2019 IEEE/SICE International Symposium on System Integration (SII), Jan. 2019, pp. 188-192.

\* cited by examiner

| BATCH NO. | TIMESTAMP | SIGNAL GEN. ID | OBSERVATION SIGNAL ID | REFERENCE SIGNAL ID | METRIC | ANOMALY |
|---|---|---|---|---|---|---|
| 1 | 12:00:00 | SM-001 | 001 | 001 | 0 | 0 |
| 1 | 12:00:00 | SM-002 | 002 | 002 | 5 | 0 |
| 1 | 12:00:00 | SM-003 | 003 | 003 | 3 | 0 |
| 1 | 12:00:00 | SM-004 | 004 | 004 | 9 | 1 |
| ... | ... | ... | ... | ... | ... | ... |
| 1 | 12:00:00 | SM-00N | 00ON | 00ON | 7 | 0 |

FIG. 6

MULTIVARIATE AND MULTI-TIMESCALE ANOMALY DETECTION

TECHNICAL FIELD

The present disclosure relates to anomaly detection and, more specifically, to detecting anomalies in time series signals.

BACKGROUND

Anomaly detection refers to the identification of rare or unusual occurrences in a system significantly deviating from normal behavior or expected patterns. These occurrences are referred to as anomalies and can occur due to various reasons, such as errors in data collection, fraudulent activities, malfunctions, faults, failures and the like. Anomaly detection plays a crucial role in various domains, including fraud detection, network intrusion detection, fault detection, industrial quality control, and healthcare monitoring.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 6 illustrates a data structure of an example signal log in accordance with one or more embodiments.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram in order to avoid unnecessarily obscuring the present invention.

1. GENERAL OVERVIEW
2. ANOMALY DETECTION ENVIRONMENT
3. ANOMALY DETECTION ARCHITECTURE
4. DETECTING ANOMALIES
5. REPRESENTATION LEARNING MODEL TRAINING
6. METRIC CONVERSION MODEL TRAINING
7. ANOMALY DETECTION EXAMPLE
8. HARDWARE OVERVIEW
9. MISCELLANEOUS; EXTENSIONS

1. GENERAL OVERVIEW

One or more embodiments detect anomalies in time-series signals output by one or more signal generators. A system including multiple anomaly detection modules is configured to detect anomalies in respective time-series signals, which can include sample data having different timescales. The system combines the outputs of the anomaly detection modules to generate an anomaly detection report identifying the signal generators transmitting the detected anomalies.

One or more embodiments of an anomaly detection module transform the values included in an observation signal received from a respective signal generator into a multidimensional representation, such as an image or a map. A system transforms the observation signal by combining the observation signal with a related reference signal. The anomaly detection module can then process multidimensional representation to extract portions indicative of anomalies. The system can determine the portions of the multidimensional representation using a machine learning model trained to identify regions of multidimensional representation indicating anomalies and excluding regions that contains little or no information about the presence of anomalies. In some embodiments, the model is a convolutional neural network ("CNN" or "ConvNet") trained using deep learning techniques based on normal data samples that are the same or similar to samples output by the signal generator. Based on the extracted portions of the multidimensional representation, the anomaly detection module determines a metric representing the observation signal and determines that an anomaly occurred when the metric satisfies anomaly detection criteria.

One or more embodiments described in this Specification and/or recited in the claims may not be included in this General Overview section.

2. ANOMALY DETECTION ENVIRONMENT

Figure 1:
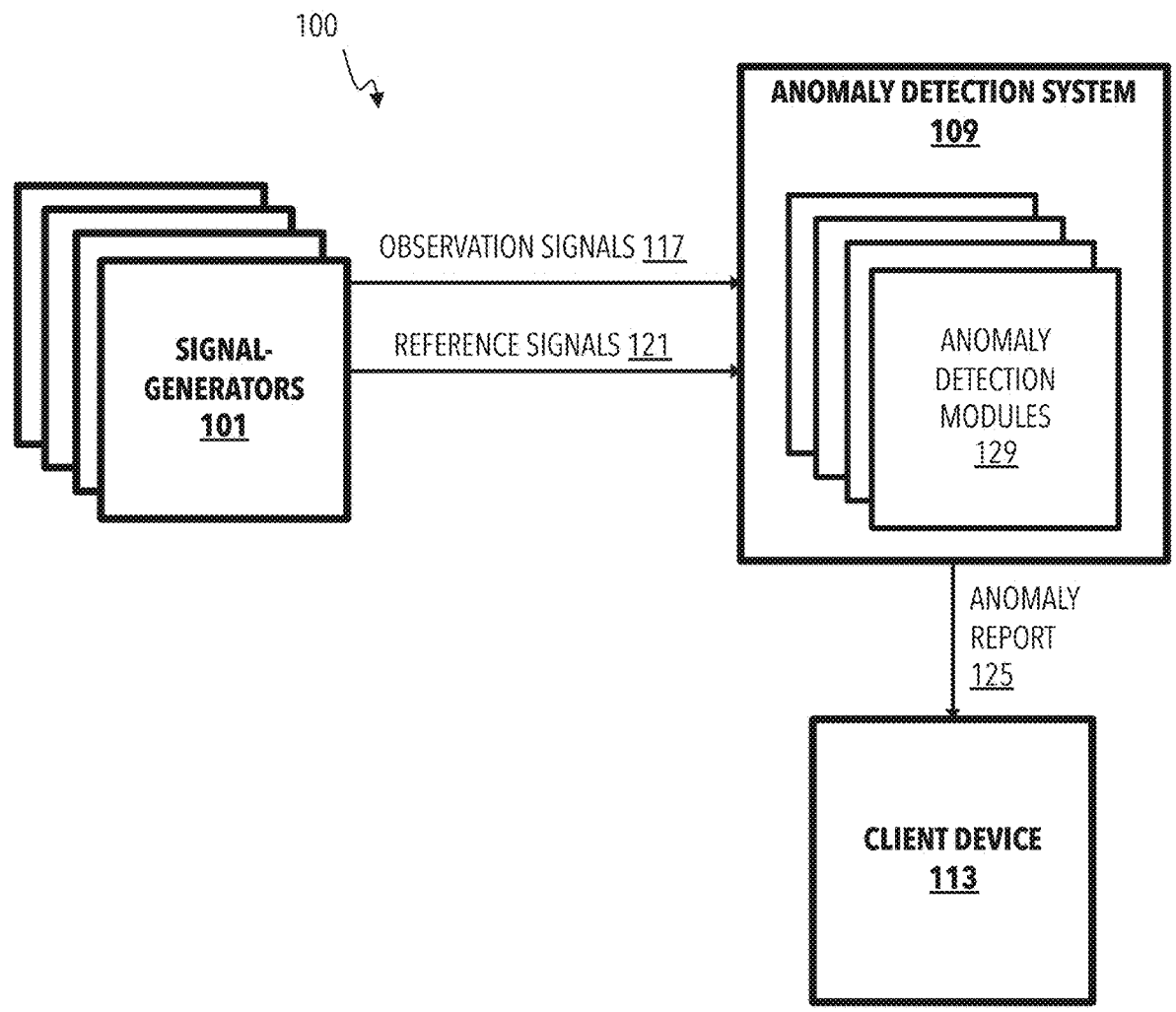
FIG. 1 illustrates a functional block diagram of an example system environment in accordance with one or more embodiments.

FIG. 1 illustrates an example system environment 100 for detecting anomalies. In one or more embodiments, the system environment 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

The system environment 100 includes signal generators 101, an anomaly detection system 109, and a client device 113 communicatively connected, directly or indirectly via one or more communication links and can be devices monitored by the anomaly detection system 109. The signal generators 101 can be any type of device or system, such as smart utility meters, computing systems, financial transaction systems, maintenance systems, vehicle control systems, climate control systems, security systems, and the like.

The signal generators 101 generate respective observation signals 117 and reference signals 121, which can be unidimensional, chronologically ordered sample values that vary over time. For example, the signal generators 101 can be smart utility meters generating observation signals 117 including samples of measurements from power consumption sensors, and reference signals 121 including samples of measurements from temperature sensors. When operating under normal and/or nominal conditions or patterns, the signal generators 101 generate samples having values within normal ranges, such as substantially cyclical rises and falls in power consumption over time. In the event that sporadic or atypical conditions or patterns occur, the signal generators 101 generate samples having anomalous values, such as extraordinarily high power consumption occurring at an atypical time.

Different sets of observation signals 117 and reference signals 121 can contain multi-variant samples, such that the values included a first set of observation signals 117 and reference signals 121 has a different timescale than a second set of observation signals 117 and reference signals 121. A timescale is a substantially consistent interval between consecutive values or samples in a time-series. For example, an observation signal 117 having a first timescale can be sampled once every minute. Whereas another observation signal 117 having a second timescale can be sampled once every 15 minutes.

Additionally, the signal generators 101 can have unique identifiers (IDs). The observation signals 117 and reference signals 121 output by the signal generators 101 can be labeled by the unique identifier of the respective signal generator 101. For example, a first signal generator 101 can output an observation signals 117 and a reference signal 121 in batches labeled with the unique identifier of the first signal generator 101. Additionally or alternatively, the first signal generator 101 can incorporate the unique identifier in the observation signals 117 and reference signals 121. For example, the unique identifier can be included as a header of a batch of signals or periodically incorporated among the values.

The anomaly detection system 109 can be configured to monitor the signal generators 101, detect anomalies included in the observation signals 117 and reference signals 121, and output an anomaly report 125 to the client device 113, identifying signal generators 101 outputting anomalous data. The anomaly report 125 can be a perceptible alert presented by a user interface and/or a datafile indicating the signal generators 101 from which the observation signals 117 including anomalous data originated.

The anomaly detection system 109 can include one or more anomaly detection modules 129 that detect anomalies. The anomaly detection modules 129 can include machine learning models trained to identify and classify anomalous information generated from the observation signals 117. The machine learning models can be individually trained using training data corresponding to particular signal generators 101 or types of signal generators 101. For instance, a first anomaly detection module 129 for a utility power meter can be trained using data recorded during the spring season and a second anomaly detection module 129 can be trained using data recorded during the winter. By doing so, the anomaly reports 125 can accurately predict anomalies during more than one season.

The client device 113 can be one or more computing devices allowing users to access and interact with topology analysis system 111. For example, the client device 113 can be a personal computer, workstation, server, mobile device, mobile phone, tablet device, processor, and/or other processing device capable of implementing and/or executing server processes, software, applications, etc. The client device 113 can include one or more processors that process software or other computer-readable instructions and include a memory to store the software, computer-readable instructions, and data. The client device 113 can also include a communication device to communicate with anomaly detection system 109 via the communication links. Additionally, the client device 113 can generate a computer-user interface enabling a user to interact with the anomaly detection system 109 using input/output devices and present anomaly reports 125 to users.

Additionally, while FIG. 1 illustrates the signal generators 101, the anomaly detection system 109, and the client device 113 as separate components, it is understood that embodiments can combine one or more of the signal generators 101, the anomaly detection system 109, and the client into a single system. Additionally, it is understood that the functionality of one or more of the signal generators 101, the anomaly detection system 109, and the client can be divided into separate systems.

3. ANOMALY DETECTION ARCHITECTURE

Figure 2:
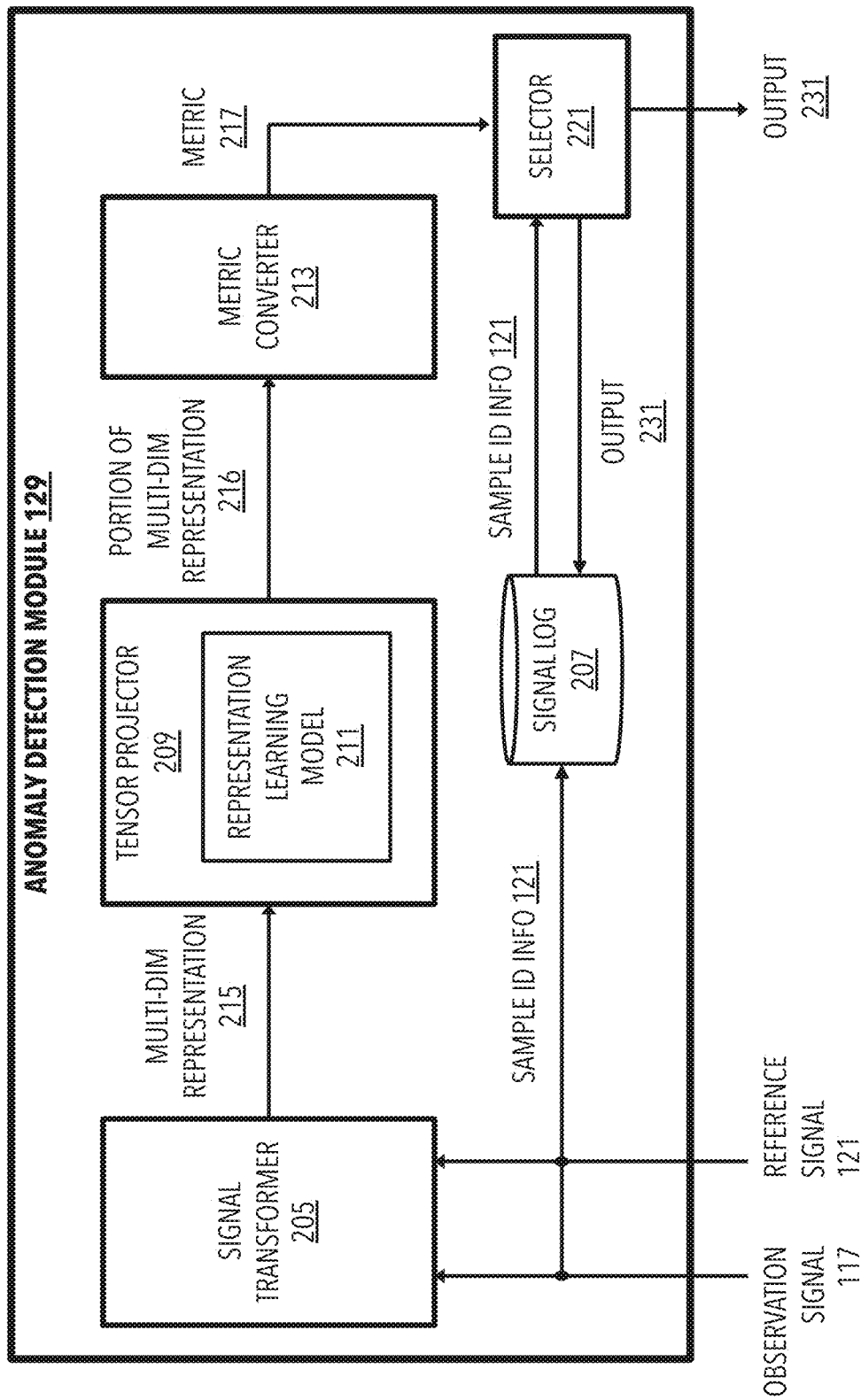
FIG. 2 illustrates a functional flow diagram of an example anomaly detection module in accordance with one or more embodiments.

FIG. 2 illustrates a functional flow block diagram of an example anomaly detection module 129 in accordance with one or more embodiments. The example anomaly detection module 129 includes hardware and software that receives an observation signal 117 and a reference signal 121, which can be the same or similar to those previously described, and outputs an anomaly report 203. The observation signal 117 and the reference signal 121 can include a unique ID of the signal generator (e.g., one of signal generators 101) that generated the respective an observation signal 117 and a reference signal 121. Additionally, the observation signal 117 and the reference signal 121 can have the same timescale or substantially the same timescale. It is understood that a different anomaly detection module 129 may receive an observation signal 117 and a reference signal 121 having different timescales. Furthermore, some embodiments of the anomaly detection module 129 receive and/or process the observation signal 117 and the reference signal 121 in batches. For example, sensor may periodically transmit data logged in the observation signal 117 and the reference signal 121 over a particular time frame. Additionally or alternatively the anomaly detection module 129 receive the observation signal 117 and the reference signal 121 in streams and store the signals in batches.

As illustrated in FIG. 2, the example anomaly detection module 129 includes a signal transformer 205, a signal log 207, a tensor projector 209, a metric converter 213, and a selector 221. While FIG. 2 illustrates the signal transformer 205, the signal log 207, the tensor projector 209, the metric converter 213, and the selector 221 as separate components, it is understood that some embodiments can combine two or more of these components. Additionally, it is understood that some embodiments can divide the functionality of one or more components into separate components.

The signal transformer 205 can be hardware, software, or a combination thereof that receives the observation signal 117 and the reference signal 121, pre-processes the signals, and transforms one or both of the signals into a multidimensional representation 215. Pre-processing the observation signal 117 and/or the reference signal 121 can include performing techniques, such as normalizing, noise-filtering, and de-trending. The pre-processing can also include synchronizing and up/down-sampling of the values in the time series data to adjust and/or match timescales. Some embodiments preprocess and transform only the observation signal 117 in the multidimensional representation 215. Some other embodiments preprocess and transform both the observation signal 117 and the reference signal 121 into a multidimensional representation 215 combining the two signals, which may substantially improve performance with respect to solely using the observation signal 117.

Transforming the observation signal 117 and/or the reference signal 121 includes converting the observation signal 117 into the multidimensional representation 215. The multidimensional representation 215 can be, for example, a tensor encoding data of a recurrence plot. For example, FIGS. 3A-3D illustrate examples of two-dimensional recurrence plots 305, 310, 315, and 320 visually representing recurrence patterns within univariant time series 307, 311, 317, and 323, respectively. FIGS. 3A-D can be Gramian angular fields (GAFs) of that one-dimensional observation signals 117, which provide a visual representation of the temporal relationships within time series. Variations in a GAF derived from a time series may be indicative of anomalies used for anomaly detection.

Figure 3D:
FIGS. 3A, 3B, 3C, 3D, and 3E illustrate example multi-dimensional representations of time-series data in accordance with one or more embodiments.
Figure 3C:
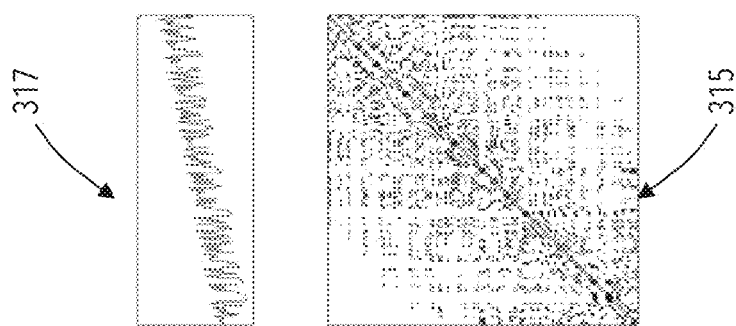
Figure 3B:
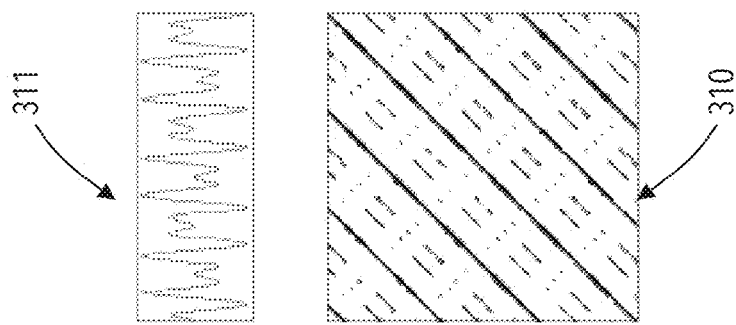
Figure 3A:
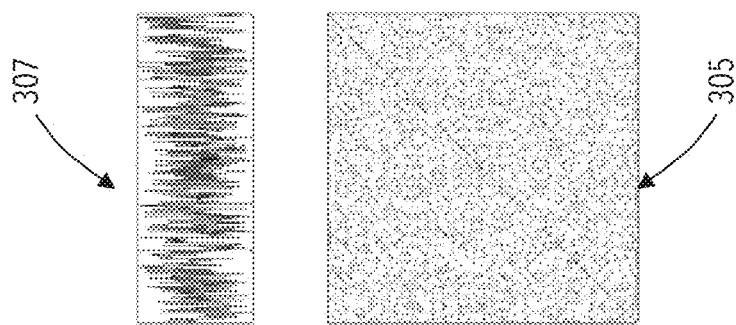
Figure 3E:
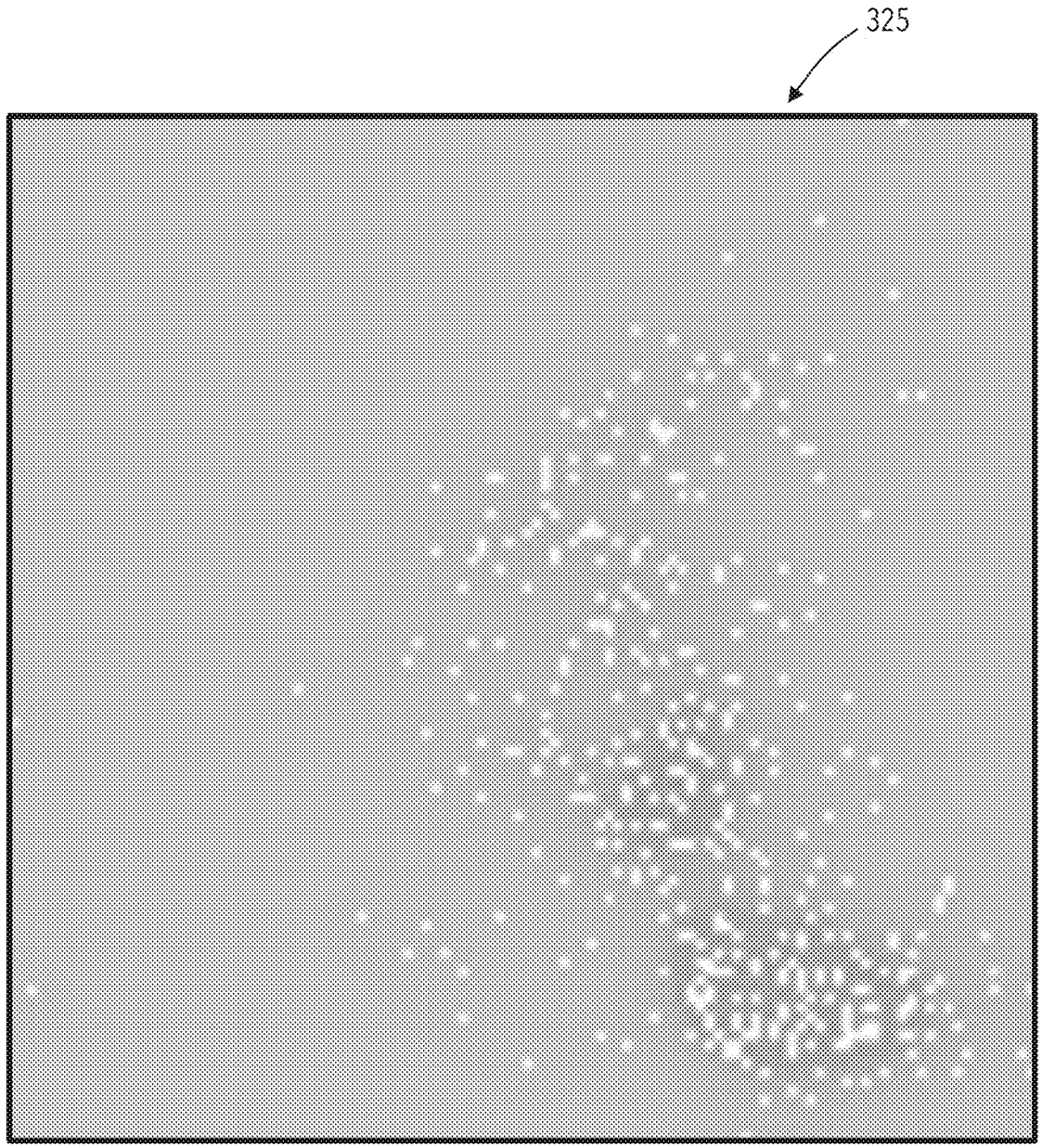

Additionally, FIG. 3E illustrates an example of a heatmap 325 visually representing two univariant time series after transformation. A heat map is a data visualization representing the density or intensity of values within a two-dimensional area. A heat map colors to encode data, where each color represents a different level of intensity or frequency to reveal patterns unapparent in raw data. Generating a heat map involves assigning individual values of the observation signal 117 and the reference signal 121 a color based on their respective value, wherein the intensity of the color corresponds to the magnitude of the data. For example, FIG. 3E shows an example of a heatmap 325 generated from another transformation that is used in smart meter analytics. Two quantities, such as voltage and electrical load, are discretized and represented along the vertical (Y) and horizontal (X) axes, respectively. The axes of the heatmap 325 represent discretized values of a quantity, and the intensity of each locus represents the strength of the relationship between values at different combinations of axes.

The tensor projector 209 can be hardware, software, or a combination thereof that transforms the multidimensional representation 215 output by the signal transformer by extracting one or more portions of the multidimensional representation 216 including information most indicative of anomalies. For example, in the heatmap 325 illustrated in FIG. 3E, regions in the four corners may be portions of the multidimensional representation most indicative of a power surge at a utility meter. Whereas the central region of the heatmap 325 may be a portion of the multidimensional representation that contains little or no information about anomalies included in the observation signal 117 and, hence, is potentially of limited use in the detection of anomalies.

As described below, the tensor projector 209 can include a representation learning model 211 that extracts the portion of the multidimensional representation 216. Some embodiments of the representation learning model 211 can be a machine learning model trained to identify regions of the multidimensional representation 215 (e.g., the four corners of the heatmap 325) including information most indicative of anomalies. When extracting the portion of the multidimensional representation 216, the representation learning model 211 can capture values representing the contents of the heatmap 325 by giving greater weight to regions of the heatmap including the values corresponding the identified regions.

The metric converter 213 can be hardware, software, or a combination thereof that transforms the portion of the multidimensional representation 216 output by the tensor projector 209 into a metric 217 representing a quantified measure of similarity to normalcy. For example, the metric converter 213 can generate the metric 217 by converting the portion of the multidimensional representation 216 into a scaler or vector. Some embodiments determine the metric 217 using a generative classifier (e.g. kernel density estimator), as described below. A generative classifier in the present context can take the form of a statistical model that learns the underlying joint probabilities of normalcy.

The selector 221 can be hardware, software, or a combination thereof that determines whether the metrics 217 generated by the metric converter 213 satisfy one or more anomaly detection criterion. For example, if the metric 217 is a scalar value, the selection criteria can be a threshold value. In such case, a metric 217 may be considered anomalous if the metric 217 exceeds the threshold. Alternatively, the selector 221 can compare the metric 217 to a Gaussian distribution and determine a distance of the metric 217 from mean. On the other hand, if the metric 217 is a multidimensional vector, the selector 221 can use a line or a hyperplane as the selection criteria.

Additionally, the selector 221 can generate output 231 associating the anomaly determination with an identifier of the signal generator of the observation signal 117 corresponding to the metric 217. For example, the selector 221 can retrieve the sample ID from the signal log 207. Some embodiments also update the signal log 207 with the metric 217 and anomaly determination output 231.

4. DETECTING ANOMALIES

Figure 4A:
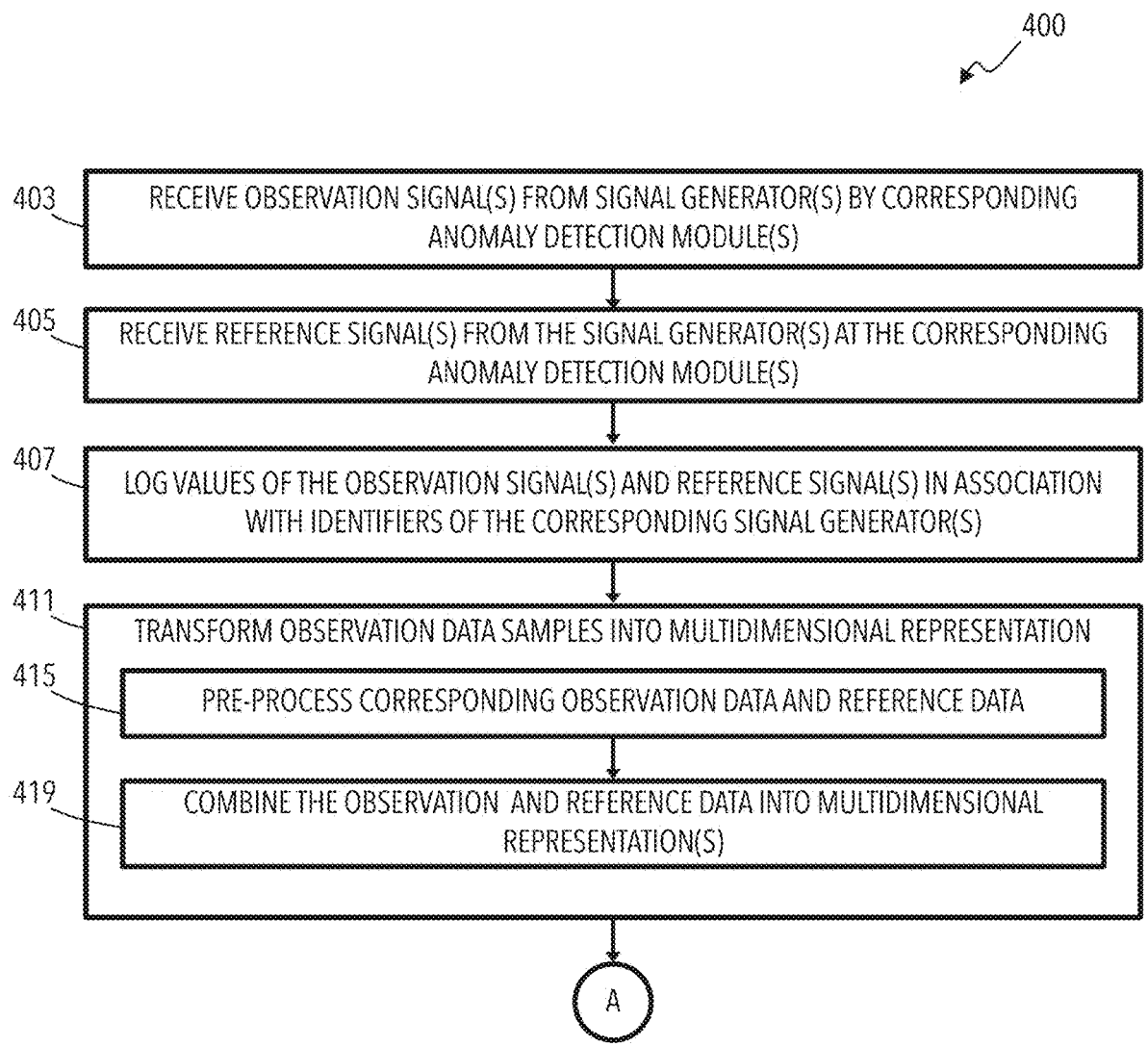
FIGS. 4A and 4B illustrate a set of operations of an example anomaly detection system in accordance with one or more embodiments.
Figure 4B:
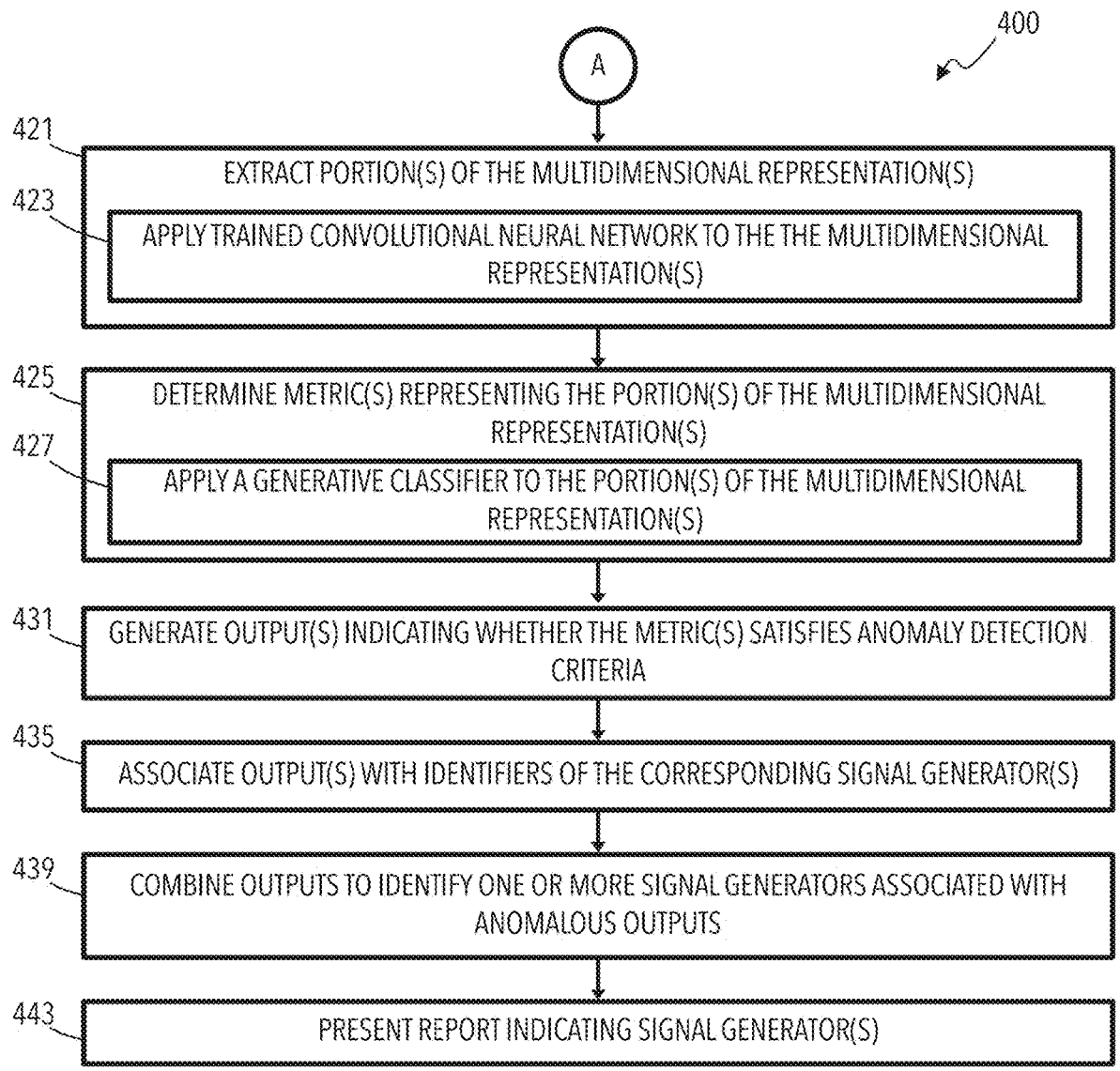

FIGS. 4A and 4B illustrate an example set of operations for detecting anomalies in accordance with one or more embodiments. One or more operations illustrated in FIGS. 4A and 4B may be modified, rearranged, or omitted all together. Accordingly, the particular sequence of operations illustrated in FIGS. 4A and 4B should not be construed as limiting the scope of one or more embodiments. Each block in FIGS. 4A and 4B can represent a module, segment, or portion of program instructions, which includes one or more computer executable instructions for implementing the illustrated functions and operations. Additionally, each block and combinations of blocks in the flow diagrams can be implemented by special-purpose hardware-based systems that perform the specified functions or acts, or combinations of special-purpose hardware and computer instructions.

Referring to FIG. 4A, at block 403, a system (e.g., anomaly detection system 109) receives observation signals (e.g., observation signals 117) including time-series samples from one or more signal generator devices (e.g., signal generators 101). The samples included in different observation signals can have different timescales. For example, referring to the example anomaly detection system 109 illustrated in FIG. 5 below, observation signal 117A and observation signal 117B can include samples captured at different sampling periods. Additionally, some embodiments receive and process the samples of the observation signals in batches. For example, the system can periodically receive some batches every second and receive other batches every hour.

Additionally, at block 405, the system receives reference signals (e.g., reference signals 121) including time-series samples from the one or more signal generator devices. The reference signals can be related to the corresponding observation signals and include values having the same or substantially the same timescale as the corresponding observation signal values. For example, referring to FIG. 5, observations signal 117A and reference signal 121A can have the same timescales. Likewise, observations signal 117B and reference signal 121B can have the same or substantially the same timescales. While blocks 403 and 405 are described as separate blocks, it is understood the observation signals and the reference signals can be received substantially simultaneously in a same batch and/or transmission.

At block 407, the system logs the received observation signal values and reference signal values in association with identifiers of the respective signal generators from which the data was received. For example, FIG. 6 illustrates a data structure 600 of a signal log (e.g., signal log 207) maintained by the system to track incoming observation and reference signal values from the signal generators. For individual observation signals or for respective observation and reference signals, the signal log can store a batch number identifier 605, a batch receipt timestamp 609, a signal generator ID 613 of the source signal generator, observation signal identifier 617, a reference signal identifier 621. Additionally, as described below, the data structure 600 can be updated with values an anomaly detection metric in column 625 and an anomaly indicator in column 629, as described below.

At block 411, the system transforms (e.g., using signal transformer 205) the observation signal values into a multidimensional representation (e.g., multidimensional representation 215). As described above, the transformation can be, for example, generating a Gramian Angular Field (GAF), a recurrence plot, or a heat map, which can be encoded as tensors. Transforming the observation signals can include, at block 415, pre-processing the observation signal received at block 403 and the reference signal received at block 405. Pre-processing the signal values can include normalizing, offsetting, time-shifting, and the like. Transforming can include, at block 419, combining the observation signal values and the reference signal values into the multidimensional representation.

Referring to FIG. 4B, as indicated by off-page connector "A," at block 421, the system (e.g., using tensor projector 209) extracts portions of the multidimensional representation determined at block 411 (e.g., portion of multidimensional representation 216). The portions can be substantially smaller than the respective multidimensional representations. For example, the portions can be two-dimensional vectors encoded as a tensor. Extracting the portions of the multidimensional representation can include, at block 423, applying a trained convolutional neural network (e.g., representation learning model 211). As previously described, the convolutional neural network can be trained to recognize and extract regions of the multidimensional representation indicative of anomalies.

At block 425, the system (e.g., using metric converter 213) determines metrics (e.g., metric 217) for the portions of the multidimensional representation determined at block 421. The system can determine the metrics by converting the portions of the multidimensional representation into scaler values or vector values, for example. Some embodiments determine the metrics by, at block 427, applying a generative classifier trained to convert the portions of the multidimensional representation (e.g., which may be a tensor) by capturing the characteristics of normalcy. The trained generative classifier scores a portion of a multidimensional representation by determining whether the portion "lands" on the estimated mass of the density and, based on the landing, determines whether the portion is similar to normal by the density. Whereas, if the portion "lands" further away from the mass of the density, the portion has a greater chance of being anomalous. The system can determine the distance from the mass of the density to calculate a similarity to normalcy.

At block 431, the system (e.g., using selector 221) generates outputs (e.g., output 231) indicating whether the metrics determined at block 425 satisfy anomaly detection criteria. The system can determine the output values by comparing the metric determined at block 425 with one or more thresholds. For example, if a metric determined has a value of 0.95, and if a threshold that is used as the selection criteria is 0.75, then the corresponding observation signal will be labeled as anomalous since 0.95 exceeds the threshold. Whereas another observation signal having metric with a value of 0.4 is considered normal or non-anomalous because the metric does not exceed the threshold. Some embodiments generate the outputs as Boolean values representing one of "normal" (e.g., 0) and anomalous (e.g., 1).

At block 435, the system (e.g., using selector 221) associates the outputs generated at block 431 with identifiers of the signal generators that were the source of the observation signals. For example, the system can associate the outputs with the corresponding device identifiers stored in the signal log (e.g., signal log 207). Some embodiments update of the corresponding signal in the signal log with the metric value (e.g., column 625 of data structure 600) determined at block 427 and the anomaly detection output (e.g., column 629 of data structure 600) determined at block 431.

Figure 5:
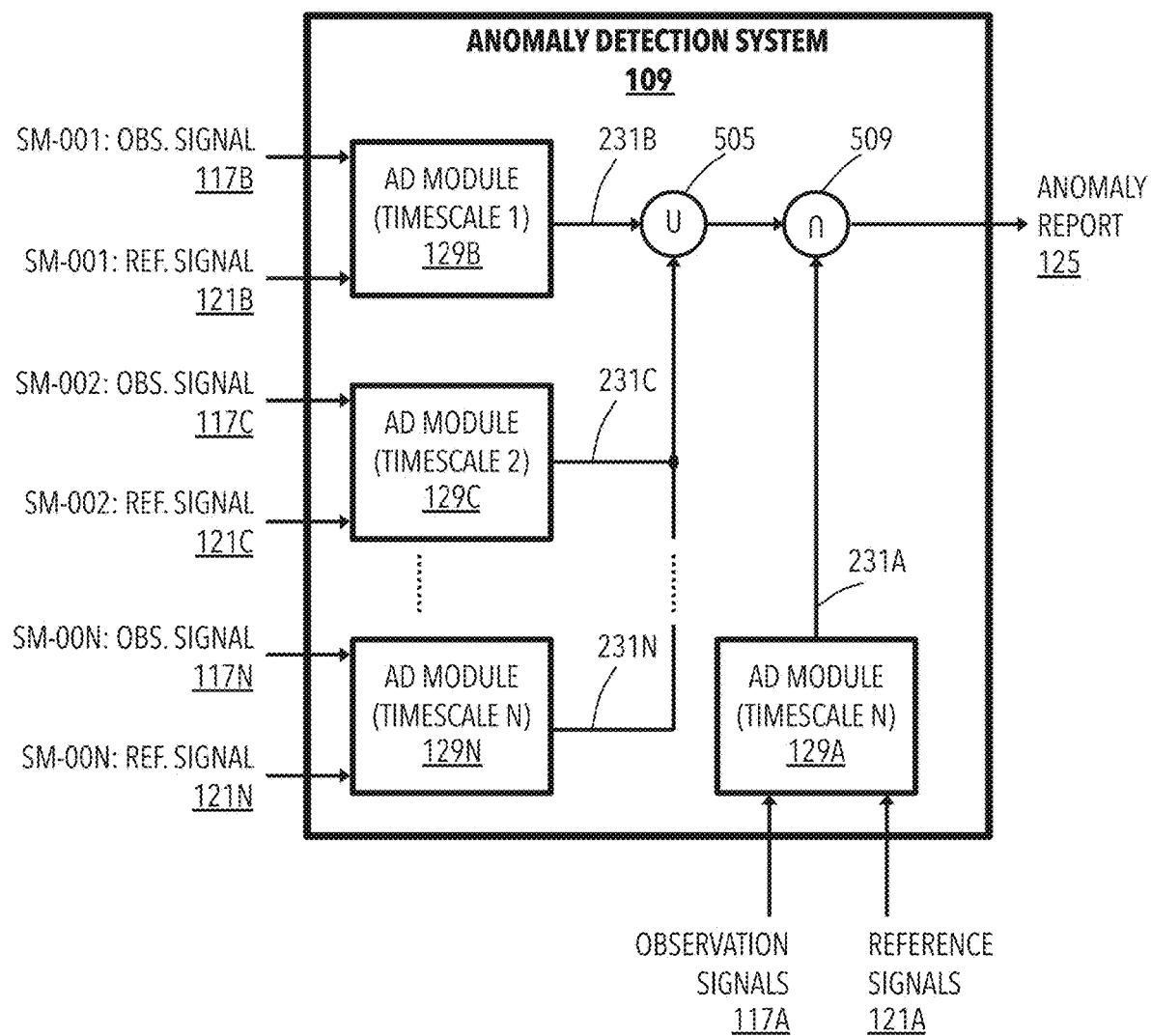
FIG. 5 illustrates a functional flow diagram of an example anomaly detection system in accordance with one or more embodiments.

At block 439, the system (e.g., using selector 221) combines the outputs determined at block 431 to identify signal generators outputting anomalous observation data. For example, FIG. 5 illustrates an example anomaly detection system 109, including anomaly detection modules 125A-125N, where N is a positive integer value. The outputs generated anomaly detection modules 125A-125N can be Boolean values combined by logical operators 505 and 509 generating an anomaly report 129. At block 443, the system presents an anomaly report (e.g., anomaly report 125) identifying signal generators, from which observation did a corresponding to the score satisfy such a great year was received. For example, the system can transmit the anomaly report to a client device (e.g., client device 113) for display by a computer-user interface.

5. REPRESENTATION LEARNING MODEL TRAINING

As previously described, the anomaly detection modules (e.g., tensor projector 209 of anomaly detection module 129) include a representation learning model (e.g., representation learning model 211) trained to select portions of multidimensional representations (e.g., portions of multidimensional representations 216) by recognizing regions most indicative of anomalies. Some embodiments train a convolutional neural network using self-supervised learning (SSL) and data augmentation. During training, the system can use sets of multidimensional representations (e.g., tensors)

determined from normal observation signals as training data. The system augments portions of some training data to generate distorted samples representing synthetically-produced anomalous observation signals. The distortion of normal samples simulates the potential impact of anomalies on actual observation signals. Some embodiments augment the normal training data randomly changing sub-sections of the multidimensional representation. Changing a sub-sections can include altering the size, proportion, position (e.g., vertical or horizontal), angle, rotation, type, and color, color intensity, and combinations thereof. The system applies the training data set and the augmented data set to train the convolutional neural network. The training data can be labeled to indicate whether a sample value is unaugmented, normal data of observation data or augmented, anomalous data. For example, normal training data can be labeled as zero or considered as negative; and the anomalous training data can be labeled as one considered as positive. A convolutional neural network model is iteratively trained using the training data, wherein feedback from a loss function determines a difference between expected outputs of the model and the labels of the training data. The trained convolutional neural network model is then saved for evaluating multidimensional representations and extracting a portion of the multidimensional representation indicative of anomalies.

6. METRIC CONVERSION MODEL TRAINING

As described above, some embodiments of the system apply a generative classifier trained to convert portions of multidimensional representations (e.g., portions of multidimensional representations 216) into metrics (e.g., metric 217). Some embodiments determine the generative classifier by training a kernel density estimator using projections of tensors generated from normal (i.e., non-anomalous) observation signals (e.g., observation signal 117). Training the kernel density estimator can include estimating the underlying probability density function of a set of observation signal values. The training places a kernel (a smooth, symmetric, and non-negative function) at each value and sums up the contributions from all kernels to obtain the overall probability density estimate. Some embodiments of the kernel density estimator use a Gaussian kernel. For each value in the training dataset, the system places a kernel centered at the value. After placing the kernels, the system determines the combined contributions of the kernels to obtain an overall kernel density estimate. Then, for each point in the domain of interest, the density estimate is the sum of the contributions from all kernels centered around the values. Once the kernel density estimator is trained, the kernel density estimator can be applied to estimate the probability density at any value in the domain. The probability densities can be used to derive the metrics representing the portions of multidimensional representations.

7. ANOMALY DETECTION EXAMPLE

FIG. 5 illustrates an example embodiment of an anomaly detection system 109 in accordance with one or more embodiments. The anomaly detection system 109 processes, transforms, projects, and classifies observation signals 117 and reference signals 121 to identify anomalies in a same or similar manner to that previously described above. The example anomaly detection system 109 includes anomaly detection modules 129A-129N, where N is positive integer value. Each anomaly detection module 129A-129N can receive a respective pair of observation signals 117A-117N and reference signals 121A-121N and generate an output 231A-231N indicating whether the observation signals 117A-117N include anomalous values.

The outputs 231A-231N of anomaly detection modules 129A-129N are combined by logical operators 505 and 509 (e.g., union and intersection) to generate an anomaly report 125. As illustrated in FIG. 5, union logical operator 505 combines the outputs of anomaly detection modules 125B-129N and, based on the intersection logical operator 509, the output of anomaly detection module 125A functions as a gatekeeper, such that the only outputs that are anomalous and detected by anomaly detection modules 129B-129N are identified as anomalies in the anomaly report 125. It is understood that the arrangement of anomaly detection modules 129A-129N shown in FIG. 5 is an example and that other embodiments of the anomaly detection system 109 can include various configurations and combinations of anomaly detection modules 129A-129N linked by union, intersection, exclusive-or, negation/complement and other logical operations to combine the modules. In this way, different embodiments can achieve different objectives for anomaly detection through a selection of signals and arrangement of anomaly detection modules 129A-129N.

8. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
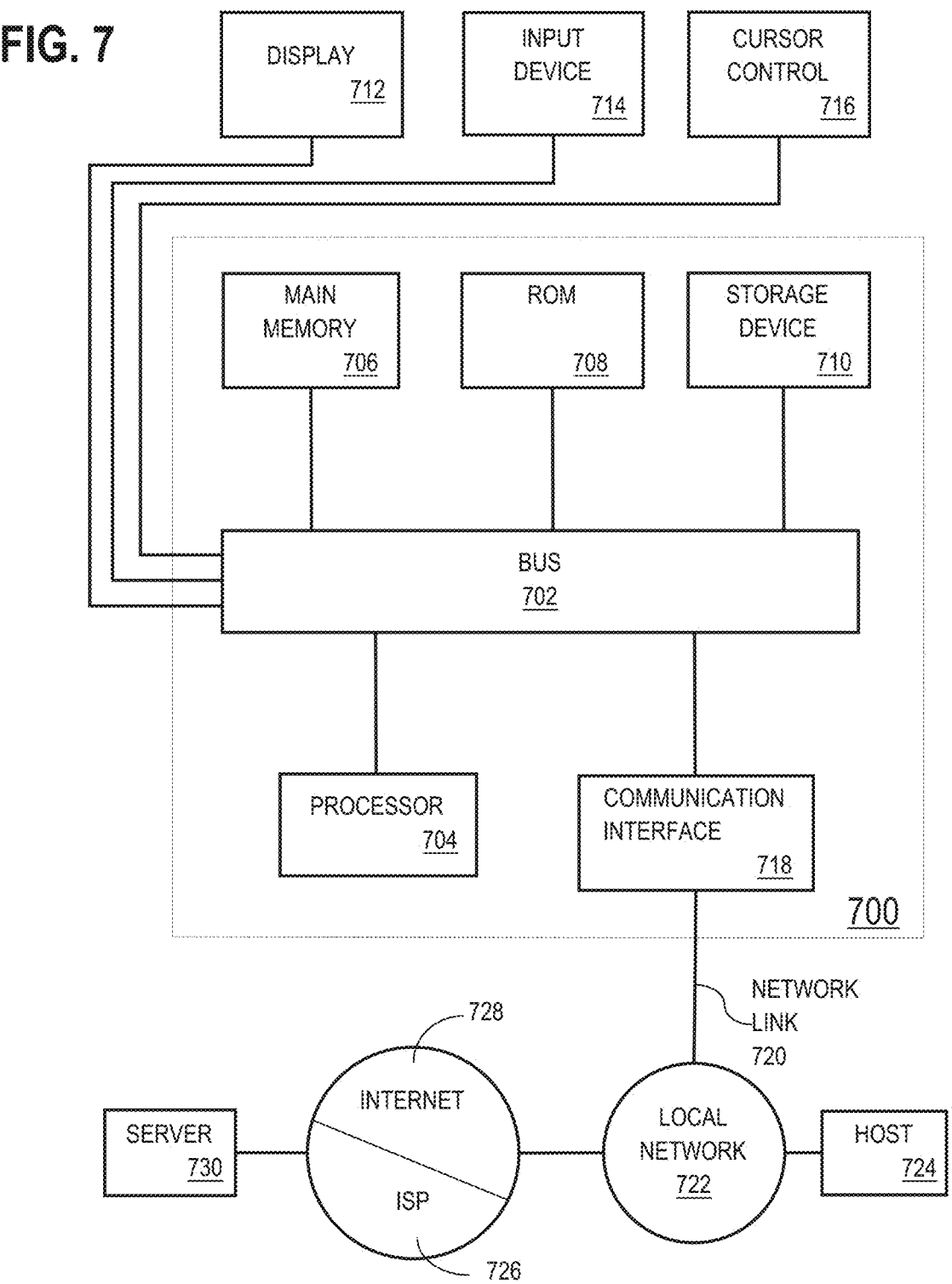
FIG. 7 shows a block diagram illustrating an example computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as the code is received, and/or stored in storage device 710, or other non-volatile storage for later execution.

9. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. An anomaly detection system comprising one or more modules configured to:
   receive an observation signal from a first signal generator, the observation signal comprising a first unidimensional series of values;
   receive a reference signal from a second signal generator, the reference signal comprising a second unidimensional series of values corresponding to the first unidimensional series of values;
   combine the observation signal with the reference signal by transforming the first unidimensional series of values of the observation signal and the corresponding second unidimensional series of values of the reference signal into a multidimensional representation, the multidimensional representation comprising a multidimensional image;
   identify a portion of the multidimensional image comprising a region indicative of one or more anomalies and excluding one or more regions that do not contain information indicating the presence of the one or more anomalies;
   extract the portion of the multidimensional image;
   convert the portion of the multidimensional image into a metric;
   determine that the metric satisfies an anomaly detection criteria; and
   generate an output indicating an anomaly in the observation signal from the signal generator.

2. The anomaly detection system of claim 1, wherein identifying the portion of the multidimensional image comprises: applying a convolutional neural network trained to recognize the region of the multidimensional image indicative of anomalies.

3. The anomaly detection system of claim 1, wherein determining the metric comprises:
   applying a generative classifier trained to determine the metric by capturing the characteristics of normalcy in the portion of the multidimensional image.

4. The anomaly detection system of claim 1, wherein the multidimensional image is a two-dimensional image comprising a first axis corresponding to the observation signal and a second axis corresponding to the observation signal.

5. The anomaly detection system of claim 1, wherein the multidimensional image is a three-dimensional image.

6. The anomaly detection system of claim 1, wherein:
   the first signal generator is a first sensor; and
   the second signal generator is a second sensor.

7. The anomaly detection system of claim 1, wherein:
   the observation signal comprising the first unidimensional series of values has a second time scale; and
   the reference signal comprising the second unidimensional series of values corresponding to the first unidimensional series of values and has the first timescale.

8. The anomaly detection system of claim 7, wherein the one or more modules of the anomaly detection system are further configured to:
   receive a second observation signal from a third signal generator, the second observation signal comprising a third unidimensional series of values;
   receive a second reference signal from a fourth signal generator, the second reference signal comprising a fourth unidimensional series of values corresponding to the second unidimensional series of values;
   combine the second observation signal with the second reference signal by transforming the third unidimensional series of values of the second observation signal and the corresponding fourth unidimensional series of values of the second reference signal into a second multidimensional representation, the second multidimensional representation comprising a second multidimensional image;
   identify a portion of the second multidimensional image comprising a region indicative of one or more anomalies and excluding one or more regions that do not contain information indicating the presence of the one or more anomalies;
   extract the portion of the second multidimensional image;
   convert the portion of the second multidimensional image into a second metric;
   determine that the second metric satisfies the anomaly detection criteria; and
   generate a second output indicating a second anomaly in the second observation signal from the third signal generator.

9. The anomaly detection system of claim 8, wherein:
   the second observation signal comprising the third unidimensional series of values has a second time scale; and
   the second reference signal comprising the fourth unidimensional series of values corresponding to the first unidimensional series of values and has the second timescale.

10. The anomaly detection system of claim 9, wherein the one or more modules of the anomaly detection system are further configured to:
    combine a first output indicating a first anomaly with a second output indicating the second anomaly; and
    generate a system anomaly output based on the combination of the first output and the second output.

11. A method comprising:
    receiving an observation signal from a first signal generator, the observation signal comprising a first unidimensional series of values;
    receiving a reference signal from a second signal generator, the reference signal comprising a second unidimensional series of values corresponding to the first unidimensional series of values;
    combine the observation signal with the reference signal by transforming the first unidimensional series of values of the observation signal and the corresponding second unidimensional series of values of the reference signal into a multidimensional representation, the multidimensional representation comprising a multidimensional image;
    identify a portion of the multidimensional image comprising a region indicative of one or more anomalies and excluding one or more regions that do not contain information indicating the presence of the one or more anomalies;
    extract the portion of the multidimensional image;
    converting the portion of the multidimensional image into a metric;
    determining that the metric satisfies an anomaly detection criteria; and
    generating an output indicating an anomaly in the observation signal from the signal generator.

12. The method of claim 11, wherein identifying the portion of the multidimensional image comprises:

applying a convolutional neural network trained to recognize the region of the multidimensional image indicative of anomalies.

13. The method of claim 11, wherein determining the metric comprises:
applying a generative classifier trained to determine the metric by capturing the characteristics of normalcy in the portion of the multidimensional image.

14. A system comprising:
a plurality of anomaly detection modules configured to detect anomalies in a plurality of observation signals from a plurality of signal generators, wherein:
individual anomaly detection modules of the plurality of anomaly detection modules are configured to:
receive an observation signal of the plurality of observation signals from a respective first signal generator of the plurality of signal generators, wherein the observation signal comprises a first unidimensional series of values;
receive a reference signal from a respective second signal generator of the plurality of signal generators, the reference signal comprising a second unidimensional series of values corresponding to the first unidimensional series of values;
combine the observation signal with the reference signal by transforming the first unidimensional series of values of the observation signal and the corresponding a second unidimensional series of values of the reference signal into a multidimensional representation, the multidimensional representation comprising a multidimensional image;
identify a portion of the multidimensional image comprising a region indicative of one or more anomalies and excluding one or more regions that do not contain information indicating the presence of the one or more anomalies;
extract the portion of the multidimensional image;
convert the portion of the multidimensional image into a metric;
determine that the metric satisfies an anomaly detection criteria; and
determine an output indicating an anomaly in the observation signal from the respective signal generator; and
wherein the system is configured to generate an anomaly report combining the outputs of the plurality of anomaly detection modules.

15. The system of claim 14, wherein the individual anomaly detection modules identify the portion of the respective multidimensional image by:
applying a convolutional neural network trained to identify anomalous variations in normal sample values corresponding to the respective signal generator.

16. The system of claim 14, wherein the individual anomaly detection modules determine the respective metric by:
applying a generative classifier trained to determine the metric by capturing the characteristics of normalcy in the portion of the respective multidimensional image.

17. A method comprising:
receiving a plurality of observation signals and a plurality of reference signals by a respective plurality of anomaly detection modules, wherein:
the plurality of observation signals and the plurality of reference signals comprise unidimensional series of values, and
individual observation signals of the plurality of observation signals correspond to individual reference signals of the plurality of reference signals;
combine the corresponding observation signals and reference signals by transforming, by the plurality of anomaly detection modules, the respective unidimensional series of values of the observation signals and the corresponding reference signals into multidimensional representations, the multidimensional representations comprising multidimensional images;
identifying, by the plurality of anomaly detection modules, portions of the respective multidimensional images comprising regions of the multidimensional representations indicative of one or more anomalies and excluding one or more regions of the multidimensional representations that do not contain information indicating the presence of the one or more anomalies;
extract the portions of the respective multidimensional images;
converting, by the plurality of anomaly detection modules, the respective portions of the multidimensional images into metrics;
determining, by the plurality of anomaly detection modules, whether the respective observation signals include anomalies based on to the respective metrics satisfying anomaly detection criteria;
determining, by the plurality of anomaly detection modules, outputs indicating anomalies determined in the observation signals corresponding to the respective metrics; and
generating an anomaly report combining the outputs of the plurality of detection modules.

18. The method of claim 17, wherein identifying the portions of the multidimensional images comprise: applying convolutional neural networks trained to identify anomalous variations in normal samples values corresponding to the respective signal generators.

19. The method of claim 17, wherein determining the metric comprises:
applying a generative classifier trained to determine the metric by capturing the characteristics of normalcy in the portion of the multidimensional images.

* * * * *